United States Patent
Lei

(10) Patent No.: US 10,116,156 B2
(45) Date of Patent: Oct. 30, 2018

(54) HYBRID BATTERY

(71) Applicant: Shenzhen Carku Technology Co., Ltd, Shenzhen (CN)

(72) Inventor: Xingliang Lei, Shenzhen (CN)

(73) Assignee: SHENZHEN CARKU TECHNOLOGY CO., LTD, Yifang Industrial Park, Bantian, Longgang District, Shenzhen (CN)

( * ) Notice: Subject to any disclaimer, the term of this patent is extended or adjusted under 35 U.S.C. 154(b) by 336 days.

(21) Appl. No.: 14/441,176

(22) PCT Filed: Nov. 8, 2013

(86) PCT No.: PCT/CN2013/086767
§ 371 (c)(1),
(2) Date: May 7, 2015

(87) PCT Pub. No.: WO2014/075587
PCT Pub. Date: May 22, 2014

(65) Prior Publication Data
US 2015/0303726 A1    Oct. 22, 2015

(30) Foreign Application Priority Data
Nov. 19, 2012 (CN) .......................... 2012 1 0468343

(51) Int. Cl.
*B60R 16/02* (2006.01)
*H02J 7/00* (2006.01)
(Continued)

(52) U.S. Cl.
CPC ............ *H02J 7/0054* (2013.01); *B60R 16/02* (2013.01); *H01M 10/4264* (2013.01);
(Continued)

(58) Field of Classification Search
USPC .......................................................... 307/9.1
See application file for complete search history.

(56) References Cited

U.S. PATENT DOCUMENTS

| 2004/0112320 | A1* | 6/2004 | Bolz | ....................... F02N 11/04 |
| | | | | 123/179.28 |
| 2008/0048608 | A1* | 2/2008 | Lim | ..................... H01M 10/441 |
| | | | | 320/106 |
| 2014/0055094 | A1* | 2/2014 | Takagi | ................... H02J 7/0054 |
| | | | | 320/118 |

FOREIGN PATENT DOCUMENTS

| CN | 201044370 Y | 4/2008 |
| CN | 101719557 A | 6/2010 |

(Continued)

OTHER PUBLICATIONS

"International Search Report for PCT/CN2013/086767".
Extended European Search Report for EP13855180.9.

*Primary Examiner* — Rexford Barnie
*Assistant Examiner* — Swarna N Chowdhuri
(74) *Attorney, Agent, or Firm* — Jun He Law Offices P.C.; James J. Zhu

(57) ABSTRACT

The present invention relates to a hybrid battery. The hybrid battery has a housing, a first energy storage device, a second energy storage device, a detection control circuit, an stabilizer circuit, and a charging circuit connected between the first energy storage device and the second energy storage device. Negative terminals of the first energy storage device and of the second energy storage device are coupled to a negative pole. A positive terminal of the first energy storage device is connected to a first fixed contact of a relay. A positive terminal of the second energy storage device is connected to a second fixed contact of the relay. The detection control circuit is connected to a coil of the relay. An input terminal of the relay is coupled to a positive pole.

(Continued)

The first energy storage energy, the second energy storage energy, the detection control circuit, the stabilizer circuit, the charging circuit, the relay are disposed within the housing. The positive pole and the negative pole respectively are connected to the positive electrode and to the negative electrode of an electrical device. The hybrid battery has good reliability and an extended service life and is environment friendly.

11 Claims, 1 Drawing Sheet

(51) Int. Cl.
| | |
|---|---|
| *H01M 16/00* | (2006.01) |
| *H01M 10/42* | (2006.01) |
| *H02J 7/34* | (2006.01) |
| *H01M 10/052* | (2010.01) |
| *H01M 10/06* | (2006.01) |
| *H01M 10/44* | (2006.01) |

(52) U.S. Cl.
CPC ............. *H01M 16/00* (2013.01); *H02J 7/007* (2013.01); *H02J 7/0016* (2013.01); *H02J 7/34* (2013.01); *H01M 10/052* (2013.01); *H01M 10/06* (2013.01); *H01M 10/44* (2013.01); *H01M 2010/4271* (2013.01); *H01M 2220/20* (2013.01); *Y02E 60/122* (2013.01); *Y02E 60/126* (2013.01)

(56) References Cited

FOREIGN PATENT DOCUMENTS

| | | | |
|---|---|---|---|
| CN | 102760917 A | 10/2012 | |
| CN | 102969784 A | 3/2013 | |
| DE | 102009012908 A1 | 10/2009 | |
| WO | 02/066293 A1 | 8/2002 | |
| WO | 03/088373 A2 | 10/2003 | |
| WO | WO 03088373 A2 * | 10/2003 | ............ H02J 7/0013 |
| WO | 2012/146962 A2 | 11/2012 | |

* cited by examiner

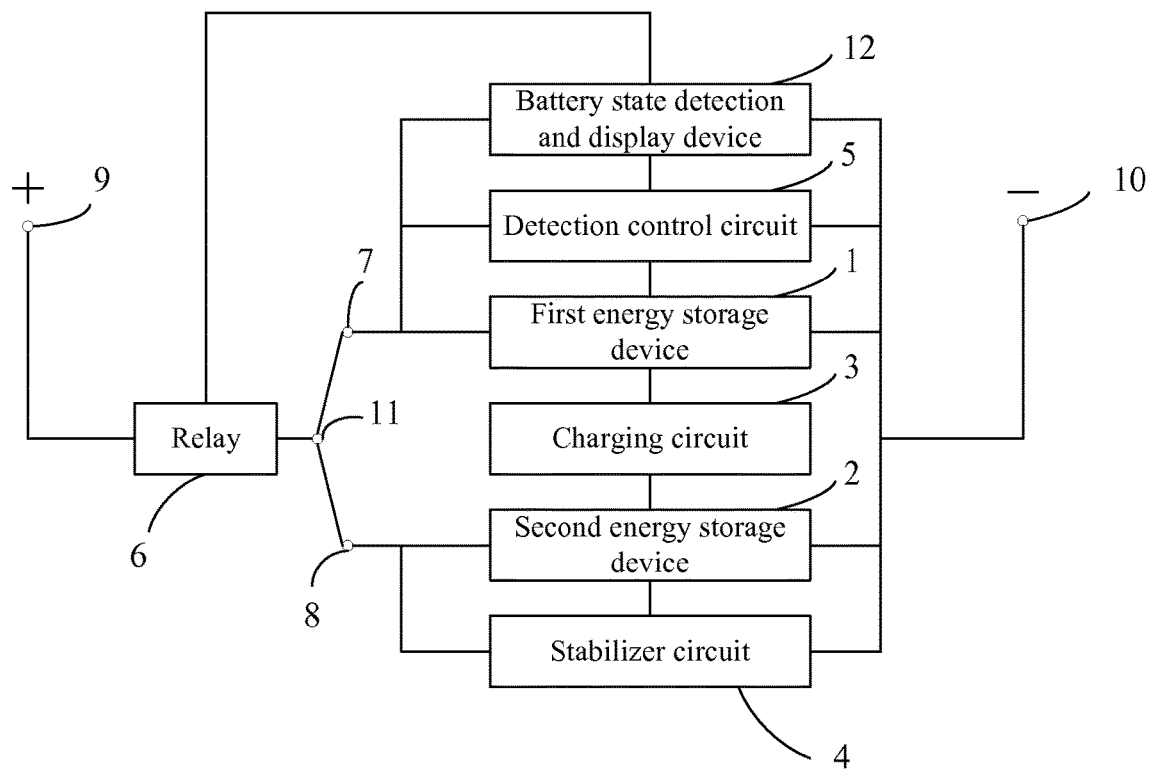

HYBRID BATTERY

CROSS-REFERENCE TO RELATED APPLICATIONS

This application is a U.S. national phase application of International Application No. PCT/CN2013/086767, filed with the State Intellectual Property Office of P. R. China on Nov. 8, 2013, which claims priority and benefits of Chinese Patent Application No. 201210468343.1, filed with the State Intellectual Property Office of P. R. China on Nov. 19, 2012, the entire content of which is incorporated herein by reference.

BACKGROUND OF THE INVENTION

A starter is generally used to start an engine in an automobile. The power of the starter is provided by a battery, e.g. a lead-acid storage battery. When the engine is working, a generator of the automobile supplies power to the electric devices in the automobile via the lead-acid storage battery, and the battery plays a role for voltage stabilization. When the engine stops, the lead-acid storage battery supplies power directly to the electric devices in the automobile. When the engine starts, it is desired to provide a current of several hundred amperes by the lead-acid storage battery to ensure successful starting of the automobile. However, the instantaneous high current discharging is extremely harmful to both the lifetime and performance of the lead-acid storage battery. Moreover, the lead acid storage battery has a low power density and insufficient discharging ability, and is not environmentally friendly. In contrast, a super capacitor has fast charging and discharging capability and has a lifetime of 500 thousands charge-discharge cycles. If the advantages of the lead-acid battery and the super capacitor can be combined, the technical requirements can be satisfied with both economical and environmental social benefits.

Chinese patent publication CN201927685U discloses a new energy source type of battery, said battery having a housing, wherein said housing having both a battery housing and a capacitor housing. A lead-acid battery pack connected in series is disposed within the battery housing. Separator plates are disposed within the lead-acid battery pack, and lead-acid battery poles are connected to the separator plates. A super capacitor is disposed within the capacitor housing, and capacitor poles are connected to the super capacitor, which are connected with the lead-acid battery poles are connected via metal wires. The patent application mainly solves certain technical problems existed in prior art, i.e., the lead-acid battery is low in power density and has insufficient instantaneous discharging capability, the capacity of the batteries used is higher than actual requirement to ensure the startup capability, the storage battery has a short lifetime due to the high current discharging, and is expensive, heavy and bulky. However, when the engine starts, it is still powered by the lead-acid storage battery and the super capacitor together, such that the instantaneous current flowing through the lead-acid storage battery will not be low and the lead-acid storage battery is not fully protected. Said parallel connection of the lead-acid storage battery and the super capacitor alone can not fully exploit the advantage of the super capacitors.

SUMMARY OF THE INVENTION

An objective of the present invention is to provide a hybrid battery. The hybrid battery can effectively switch between a first energy storage device and a second energy storage device according to an output current required. When the current is low, power is supplied by the first energy storage device; when a high current is needed at the starting moment, power is supplied by the second energy storage device to prevent the first energy storage device from being harmed by the large current at the starting moment. This effectively protects the first energy storage device, and fully exploits the fast charge-discharge characteristics of the second energy storage device to ensure normal starting of an automobile in case of failure of the first energy storage device. The hybrid battery has a longer lifetime and is environmentally friendly.

To achieve the above objectives, the following technical solutions are used in the present invention.

There is disclosed a hybrid battery. The hybrid battery comprises a housing, a first energy storage device (1) for providing a low-current power supply, a second energy storage device (2) for providing an instantaneous starting current power supply, a detection control circuit (5) coupled in parallel with the first energy storage device (1), a battery state detection and display device (12) for detecting and displaying the state of the first energy storage device (1), a stabilizer circuit (4) coupled in parallel with the second energy storage device (2) and used for protecting the second energy storage device (2), and a charging circuit (3) coupled between the first energy storage device (1) and the second energy storage device (2) and used for charging the second energy storage device (2), wherein negative terminals of the first energy storage device (1) and the second energy storage device (2) is coupled to a negative pole (10), a positive terminal of the first energy storage device (1) is coupled to a first fixed contact (7) of a relay (6), a positive terminal of the second energy storage device (2) is coupled to a second fixed contact (8) of the relay (6), the detection control circuit (5) is coupled to a coil of the relay (6), an input terminal of the relay (6) is coupled to a positive pole (9), and the positive pole (9) and negative pole (10) are coupled to a positive electrode and a negative electrode of electric loads of an automobile, respectively, and wherein the detection control circuit (5) detects a current flowing through the first energy storage device (1), when the current is a low current, a movable contact (11) of an armature of the relay (6) is connected to the first fixed contact (7) and disconnected to the second fixed contact (8), then the first energy storage device (1) is coupled between the positive pole (9) and the negative pole (10) to supply power to the automobile; when the current is a high current, the movable contact (11) of the armature of the relay (6) is disconnected to the first fixed contact (7) but connected to the second fixed contact (8), then the second energy storage device (2) is coupled between the positive pole (9) and the negative pole (10) to supply power to the automobile; the first energy storage device (1), the second energy storage device (2), the detection control circuit (5), the stabilizer circuit (4), the charging circuit (3) and the relay (6) are disposed within the housing.

In certain embodiments, the low current ranges from 20 A to 100 A, the high current is greater than 100 A.

In certain embodiments, after the movable contact (11) of the armature of the relay (6) is hold to be coupled to the first fixed contact (7) or the second fixed contact (8) for 1 to 10 s, the relay resets.

In certain embodiments, the first energy storage device (1) is a lead-acid storage battery or lithium battery pack, the second energy storage device (2) is a super capacitor pack or a lithium battery pack.

In certain embodiments, the lead-acid storage battery has a nominal voltage of 12V to 24V.

In certain embodiments, the lithium battery pack is formed of 4 to 12 lithium batteries connected in series with each other, and each lithium battery of the lithium battery pack has a capacity of 1 Ah to 80 Ah.

In certain embodiments, the super capacitor pack is formed of 4 to 12 super capacitors connected in series with each other.

In certain embodiments, each super capacitor of the super capacitor pack has a capacitance of 50 to 3000 F.

In certain embodiments, the charging circuit (3) has an output voltage of 12V to 36V, and an output current of 0.1 A to 10 A.

The present invention has advantages as follows. The hybrid battery of the present invention uses the detection control circuit to detect the current flowing through the first energy storage device in real time and turn on or off the relay. If an electric load of the automobile is used when the engine of the automobiles normally operates or stops, the current flowing through the first energy storage device is low, the movable contact of the armature of the relay is connected to the first fixed contact and disconnected to the second fixed contact, the first energy storage device is coupled between the positive pole and the negative pole to supply power to the automobile and realize voltage stabilization. When the automobile initially starts, a high current is desired by means of instantaneous discharging of a storage device. At this moment, the movable contact of the armature of the relay is not connected to the first fixed contact but connected to the second fixed contact, the second energy storage device is coupled between the positive pole and the negative pole to supply power to the automobile. Further, anytime the automobile works, the first energy storage device supplies power to the second energy storage device continuously through a charging circuit such that power is effectively stored instead of being wasted. Moreover, a stabilizer circuit is connected in parallel with the second energy storage device. The stabilizer circuit stabilizes the voltage between the two poles of the second energy storage device at certain level and protects the second energy storage device. The first energy storage device of the hybrid battery according to the present invention is a lead-acid storage battery or a lithium battery pack, while the second energy storage device is a super capacitor pack or a lithium battery pack. The hybrid battery effectively combines the advantage of the traditional lead-acid storage batteries, i.e. well-developed and low-cost, and that of the super capacitors, i.e. great performance in charging and discharging. Given the switching between the lead-acid storage battery and the super capacitor pack through a relay is accurate and timely, and the relay itself has no input voltage, thus consumes much less energy because does not divide any voltage, the lifetime of the hybrid battery is extended and the purpose of green and environmental protection is achieved. Even if the first energy storage device fails due to expired lifetime, enlarged internal resistance or power exhaustion caused by further operation after the engine has stopped, the hybrid battery still can start the automobile using the power stored in the second energy storage device.

BRIEF DESCRIPTION OF DRAWINGS

FIG. 1 illustrates a hybrid battery circuit according to the present invention.

The symbols and elements: 1—first energy storage device; 2—second energy storage device; 3—charging circuit; 4—stabilizer circuit; 5—detection control circuit; 6—relay; 7—first fixed contact; 8—second fixed contact; 9—positive pole; 10—negative pole; 11—movable contact; 12—battery state detection and display device.

DETAILED DESCRIPTION OF THE EMBODIMENTS

The present invention is further described with reference to the accompanying drawings and specific embodiments.

As shown in FIG. 1, a hybrid battery has a housing. The hybrid battery further has a first energy storage device 1 for providing a low-current power supply, a second energy storage device 2 for providing an instantaneous starting-current power supply, a detection control circuit 5 coupled in parallel with the first energy storage device 1, a battery state detection and display device 12 for detecting and displaying the state of the first energy storage device 1, a stabilizer circuit 4 coupled in parallel with the second energy storage device 2 and used for protecting the second energy storage device 2, and a charging circuit 3 coupled between the first energy storage device 1 and the second energy storage device 2 and used for charging the second energy storage device 2. Negative terminals of the first energy storage device 1 and the second energy storage device 2 are coupled to a negative pole 10, a positive terminal of the first energy storage device 1 is coupled to a first fixed contact 7 of a relay 6, a positive terminal of the second energy storage device 2 is coupled to a second fixed contact 8 of the relay 6, the detection control circuit 5 is coupled to a coil of the relay 6, an input terminal of the relay 6 is coupled to a positive pole 9, and the positive pole 9 and negative pole 10 are coupled to a positive electrode and a negative electrode of an electric load of an automobile, respectively. The detection control circuit 5 detects a current flowing through the first energy storage device 1. When the current is a low current, a movable contact 11 of an armature of the relay 6 is connected to the first fixed contact 7 and disconnected to the second fixed contact 8, then the first energy storage device 1 is coupled between the positive pole 9 and the negative pole 10 to supply power to the automobile. When the current is a high current, the movable contact 11 of the armature of the relay 6 is disconnected to the first fixed contact 7 but connected to the second fixed contact 8, then the second energy storage device 2 is coupled between the positive pole 9 and the negative pole 10 to supply power to the automobile. The first energy storage device 1, the second energy storage device 2, the detection control circuit 5, the stabilizer circuit 4, the charging circuit 3 and the relay 6 are disposed within the housing.

Further, the ranges of the high current and the low current are flexible and can be set as desired. In the embodiment, the low current ranges from 20 A to 100 A, the high current is higher than 100 A. When the first fixed contact 7 or the second fixed contact 8 of the relay 6 is connected to the movable contact 11, the connection lasts for 1 to 10 s and then the relay 6 resets.

Preferably, in the embodiment, an initial state of the relay 6 is that the movable contact 11 of the armature is connected to the fixed contact 7 but disconnected to the second fixed contact 8. When a voltage is applied between two ends of a coil of the relay 6, the movable contact 11 of the armature is disconnected to the first fixed contact 7 and connected to the second contact 8. The connection lasts for 1 to 10 s and then the relay 6 resets, the voltage between the two ends of the coil is removed, and the relay 6 restores to the initial state, i.e., the movable contact 11 of the armature is connected to the first fixed contact 7 and disconnected to the second fixed contact 8.

Specifically, the first energy storage device 1 is a lead-acid storage battery or lithium battery pack, the second energy storage device 2 is a super capacitor pack or lithium battery pack. The lithium battery pack is formed of 4 to 12 lithium batteries connected in series with each other. The capacity of the lithium battery is from 1 Ah to 80 Ah. Preferably, the lithium battery according to the invention is a lithium ion battery. The nominal voltage range of the lead-acid battery is from 12V to 24V. The super capacity pack is formed of 4 to 12 super capacitors connected in series with each other. The capacitance of the super capacitor is from 50 to 3000 F. Preferably, in the embodiment, the first energy storage device 1 is a lead-acid storage battery. The second energy storage device 2 is a super capacitor pack. The charging circuit 3 is a DC-DC charging circuit. The output voltage range of the charging circuit 3 is 12V to 36V, and the output current range is 0.1 A to 10 A.

The exterior of the hybrid battery according to the invention is provided a housing. The first energy storage device 1, the second energy storage device 2, the detection control circuit 5, the stabilizer circuit 4, the charging circuit 3 and the relay 6 are all disposed within the housing. The housing protects the internal devices and circuits. In addition, the positive pole and negative pole of the internal circuits pass through the housing and are coupled to the positive pole 9 and the negative pole 10, respectively. The positive pole 9 and the negative pole 10 are connected to a positive cable and a negative cable of an electronic load of the automobile, respectively.

The hybrid battery according to the invention uses the detection control circuit 5 to detect in real time whether the automobile is in a starting state, i.e., to detect in real time the current flowing through the first energy storage device 1, and switch on or off the connection of the movable contact 11 of the armature of the relay 6 with the first fixed contact 7 or the second fixed contact 8. When an electric load of the automobile is used during a normal operation of an automobile or when the engine of the automobile stops, the current flowing through the first energy storage device 1 is low and the detection control circuit will not provide any electric switching signal to the relay 6. There is no voltage existent between the two ends of the coil of the relay 6, so that the relay 6 does not operate and keeps in the initial connection state, i.e., the movable contact 11 of the armature of the relay 6 is connected with the first fixed contact 7 and disconnected with the second fixed contact 8. Then, the first energy storage device 1 is coupled between the positive pole 9 and the negative pole 10 to supply power to the automobile and realize voltage stabilization. When the automobile initially starts and an instantaneous high current is required to be discharged by the first storage apparatus 1, the detection circuit 5 transmits an electrical switching signal to the relay 6, a voltage is applied between the two ends of the coil in the relay 6. A current is then generated through the coil to produce an electric-magnetic effect by means of which the armature overcomes the pulling force of a bias spring and moves towards an iron core, driving the movable contact 11 of the armature connected to the second fixed contact 8 and disconnected to the first fixed contact 7. At this time, the second energy storage device 2 is connected between the positive pole 9 and the negative pole 10 to supply power to the automobile. further, whenever the automobile works, the first energy storage device 1 supplies power to the second energy storage device 2 continuously through the charging circuit 3 such that energy is quickly and effectively stored in the second energy storage device 2. Moreover, a stabilizer circuit 4 is connected in parallel with the second energy storage device 2. The stabilizer circuit 4 stabilizes the voltage between the two poles of the second energy storage device 2 within a specific range and protects the second energy storage device 2. The first energy storage device 1 of the hybrid battery according to the present invention is a lead-acid storage battery or lithium battery pack, and the second energy storage device 2 is super a capacitor pack or lithium battery pack. The hybrid battery effectively combines the advantage of the traditional lead-acid storage batteries, i.e. well-developed and low-cost, and that of the super capacitors, i.e. great performance in charging and discharging. Given that switching between the lead-acid storage battery and the super capacitor pack through the relay is timely and accurate, and that the relay itself has no input voltage and consumes very little energy because it divides no voltage, the lifetime of the hybrid battery is extended and the purpose of green and environmental protection is achieved. The hybrid battery also has said battery state detection and display device 12 connected in parallel with the first energy storage device 1, which can detect and display in real time the state of the first energy storage device 1, e.g., an amount of energy or lifetime, etc. Accordingly, it helps to determine whether the hybrid battery can be used normally. Even if the first energy storage device 1 fails due to expired lifetime, enlarged internal resistance, or the power exhaustion caused by further human operations after the engine has stopped, the hybrid battery also is still capable of starting the automobile using the power stored in the second energy storage device 2, thus the hybrid battery is highly reliable.

The aforementioned embodiment is only preferred embodiment of the present invention and is not used as a limitation to the present invention. Other variations to the disclosed embodiments can be understood and effected by those skilled in the art. Any variation, equivalent replacement or improvement within the spirits and principles of the present invention should be included in the protection scope the present invention.

What is claimed is:

1. A hybrid battery comprising:
   a first energy storage device (1) for providing a low-current power supply,
   a second energy storage device (2) for providing an instantaneous starting current power supply, and
   a detection control circuit (5) coupled in parallel with the first energy storage device (1), wherein the detection control circuit (5) detects an output current flowing through the first energy storage device (1),
   wherein the detection control circuit (5) is configured to control the first and second energy storage devices to supply power to an automobile according to the output current detected, and wherein when the output current detected is a low current, power is supplied to the automobile by the first energy storage device, and when the output current detected is a high current, power is supplied to the automobile by the second energy storage device, thereby preventing the first energy storage device from being harmed;
   wherein negative terminals of the first energy storage device (1) and the second energy storage device (2) are coupled to a negative pole (10), a positive terminal of the first energy storage device (1) is coupled to a first fixed contact (7) of a relay (6), a positive terminal of the second energy storage device (2) is coupled to a second fixed contact (8) of the relay (6), the detection control circuit (5) is coupled to a coil of the relay (6), an input terminal of the relay (6) is coupled to a positive pole (9), and the positive pole (9) and negative pole (10) are coupled to a positive electrode and a negative electrode of an electric load of the automobile, respectively;

wherein the detection control circuit (5) operates in the following manner, when the output current is a low current, under the control of the detection control circuit, a movable contact (11) of an armature of the relay (6) is connected to the first fixed contact (7) and disconnected from the second fixed contact (8), then the first energy storage device (1) is coupled between the positive pole (9) and the negative pole (10) to supply power to the automobile;

when the output current is a high current, under the control of the detection control circuit, the movable contact (11) of the armature of the relay (6) is disconnected from the first fixed contact (7) but connected to the second fixed contact (8), then the second energy storage device (2) is coupled between the positive pole (9) and the negative pole (10) to supply power to the automobile;

wherein after the movable contact (11) of the armature of the relay (6) is coupled to the second fixed contact (8) for 1 to 10 s, the relay is reset.

2. The hybrid battery according to claim 1, wherein the low current ranges from 20 A to 100 A, and the high current is greater than 100 A.

3. The hybrid battery according to claim 1, wherein the first energy storage device (1) is a lead-acid storage battery or lithium battery pack, the second energy storage device (2) is a super capacitor pack or a lithium battery pack.

4. The hybrid battery according to claim 3, wherein the lead-acid storage battery has a nominal voltage of 12V to 24V.

5. The hybrid battery according to claim 3, wherein the lithium battery pack is formed by a number of 4 to 12 lithium batteries connected in series with each other, each lithium battery of the lithium battery pack has a capacity of 1 Ah to 80 Ah.

6. The hybrid battery according to claim 3, wherein the super capacitor pack is formed by a number of 4 to 12 super capacitors connected in series with each other.

7. The hybrid battery according to claim 6, wherein each super capacitor of the super capacitor pack has a capacitance of 50 to 3000 F.

8. The hybrid battery according to claim 1, wherein the hybrid battery further comprises a charging circuit (3) coupled between the first energy storage device (1) and the second energy storage device (2) and used for charging the second energy storage device (2).

9. The hybrid battery according to claim 1, wherein the hybrid battery further comprises a stabilizer circuit (4) coupled in parallel with the second energy storage device (2) and used for protecting the second energy storage device (2).

10. The hybrid battery according to claim 1, wherein the hybrid battery further comprises a battery state detection and display device (12) for detecting and displaying the state of the first energy storage device (1).

11. The hybrid battery according to claim 8, wherein the charging circuit (3) has an output voltage of 12V to 36V, and an output current of 0.1 A to 10 A.

* * * * *